United States Patent [19]

Nakamura et al.

[11] Patent Number: 4,916,589
[45] Date of Patent: Apr. 10, 1990

[54] MOUNTING STRUCTURE FOR AUTOMOBILE LAMP

[75] Inventors: Yasuhiro Nakamura; Atsushi Iwase, both of Shizuoka, Japan

[73] Assignee: Koito Seisakusho Co., Ltd., Tokyo, Japan

[21] Appl. No.: 247,777

[22] Filed: Sep. 22, 1988

[30] Foreign Application Priority Data

Sep. 22, 1987 [JP] Japan .................................. 62-145537
Nov. 19, 1987 [JP] Japan .................................. 62-177161
Sep. 10, 1988 [JP] Japan .................................. 63-227282

[51] Int. Cl.⁴ ............................................. F21V 21/14
[52] U.S. Cl. ...................................... 362/250; 362/83; 362/239
[58] Field of Search ..................... 362/41, 61, 66, 71, 362/80, 83, 233, 239, 250, 420

[56] References Cited

U.S. PATENT DOCUMENTS 4,539,626 9/1985 Hawlitzki et al. ................. 362/83 X
4,679,125 7/1987 Dick ..................................... 362/166

FOREIGN PATENT DOCUMENTS 2626814 12/1976 Fed. Rep. of Germany ........ 362/61
2656755  6/1978 Fed. Rep. of Germany ........ 362/61
2093174  8/1982 United Kingdom .................. 362/61

*Primary Examiner*—Stephen F. Husar
*Attorney, Agent, or Firm*—Browdy and Neimark

[57] ABSTRACT

A mounting structure for mounting a clearance lamp contiguous to a headlight of an automobile. A mounting stay is formed on a lamp body of the lamp and is connected to a housing of the headlight through a resilient member to permit a limited relative resilient displacement between the lamp body and the housing in the horizontal direction. A pivotal connection consisting of a receptacle and a spherical member is provided between the lamp body and the body of the automobile at the location spaced apart from the mounting stay.

21 Claims, 16 Drawing Sheets

MOUNTING STRUCTURE FOR AUTOMOBILE LAMP

FIELD OF THE INVENTION

The present invention relates to a mounting structure of an automobile lamp and, particularly to a mounting structure of a lamp such as a clearance lamp of an automobile which is mounted contiguous to a headlight.

THE PRIOR ART

It is publicly known to mount a clearance lamp on an automobile. The clearance lamp is usually mounted contiguous to and at the rearward of a headlight and, the clearance lamp and the headlight are mounted independently on a body of the vehicle.

Recently, the headlight of the automobile tends to be formed such that the headlight is tiltable both in the vertical and transverse directions as a unit. Thus, the headlight and the clearance lamp do not necessarily create the appearance of a unitary member particularly when the headlight is tilted in the transverse directions. And it is required to form an excessive space between the clearance lamp and the headlight, thereby deteriorating the appearance.

SUMMARY OF THE INVENTION

The present invention has been made in view of the aforementioned circumstances, and aims to provide a mounting structure of an automobile lamp which is mounted contiguous to and at the rearward of a headlight, characterized in that a mounting stay is provided on a lamp body of the lamp and is connected through resilient means to a housing which tiltably supports thereon the headlight, and that a fitting pin is provided to project from either one of a portion of the lamp body being spaced apart from the mounting stay or a portion of the housing corresponding to the portion of the lamp body, and a receptacle is provided on the other of the lamp body portion and the housing portion for resiliently supporting the fitting pin and permitting axial movement of the fitting pin.

Preferably, the lamp body is formed to have one or more recessed portions at the end remote from the headlight for engaging with correspondingly shaped projections formed on a member relating to a vehicle body, thereby mounting the lamp body on the vehicle body.

BRIEF DESCRIPTION OF THE DRAWINGS

Further objects and effects of the invention will become apparent from the following detailed description in conjunction with the attached drawings, in which.

DETAILED DESCRIPTION OF THE PREFERRED EMBODIMENT

FIG. 1 through FIG. 13 show one example of a mounting structure according to the invention, which comprises a movable type headlight unit 2 having a housing 2a secured to a vehicle body 1 or the body of an automobile. A clearance lamp 3 is mounted contiguous to and rearward of the headlight unit 2. It will be noted that the wording rearward is defined with respect to the normal driving direction of the vehicle. The mechanism for moving or tilting the headlight unit 2 in the vertical and/or the horizontal directions so as to adjust the light beam of the headlight as desired is publicly known.

Figure 10:
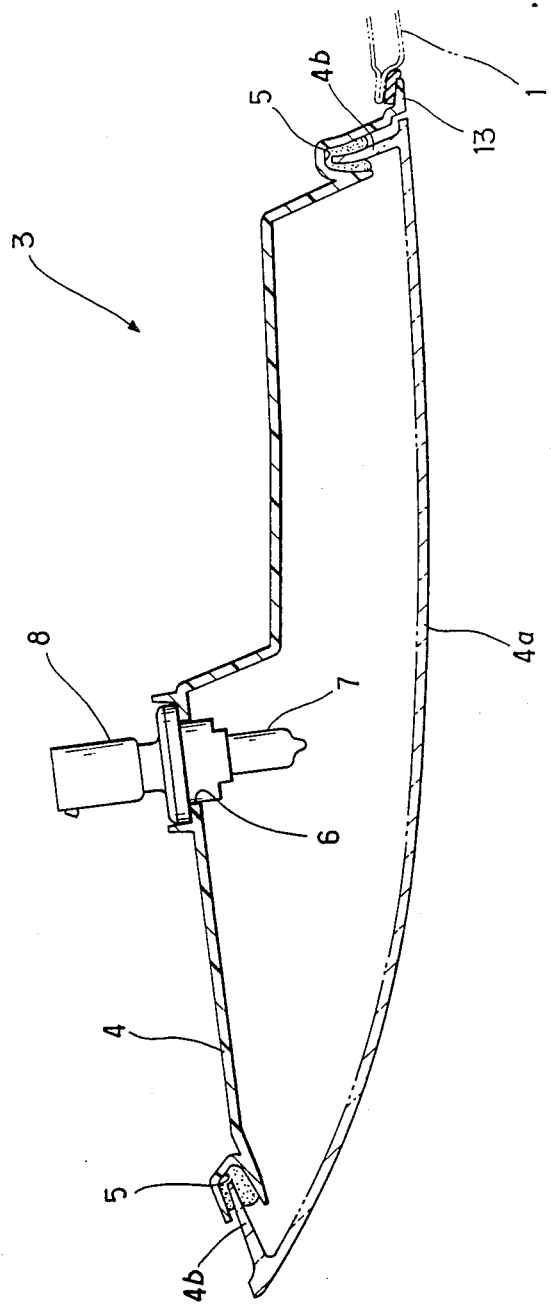
FIG. 10 is a section view taken along line X—X in FIG. 1.

The clearance lamp 3 has a lamp body 4 formed of a synthetic resin material, and a mounting groove 5 is, as shown in FIG. 10, formed in the outer circumference of the lamp body 4 to receive a leg portion 4b of a lens 4a which covers the lamp body 4. An electric bulb 7 supported on a socket plug 8 is mounted on a mounting bore 6 formed in the central portion of the lamp body 4.

A mounting stay 9 is, as shown in FIGS. 2, 3, 4 and 6, formed on the lamp body 4 at the upper edge and near to the headlight 2, and has an oval or elongated circular opening 10 in the tip end portion thereof.

Figure 5:
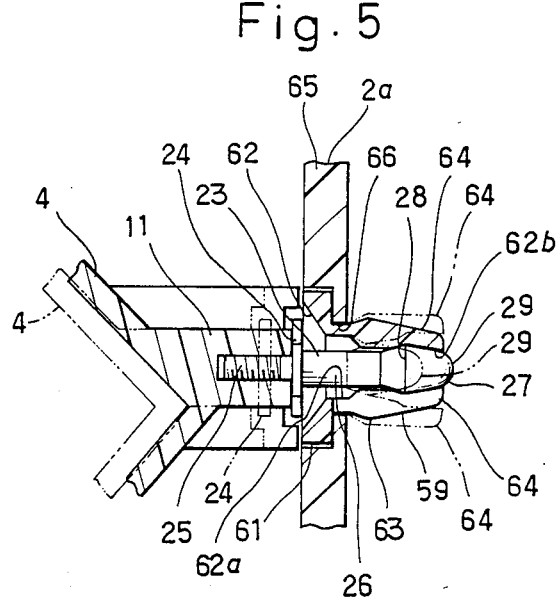
FIG. 5 is a section view taken along line V—V in FIG. 3.

A boss 11 is formed on the lower edge of the lamp body 4 at the location generally corresponding to the stay 9 for mounting thereon a fitting pin 23 as shown in FIG. 5.

Figure 3:
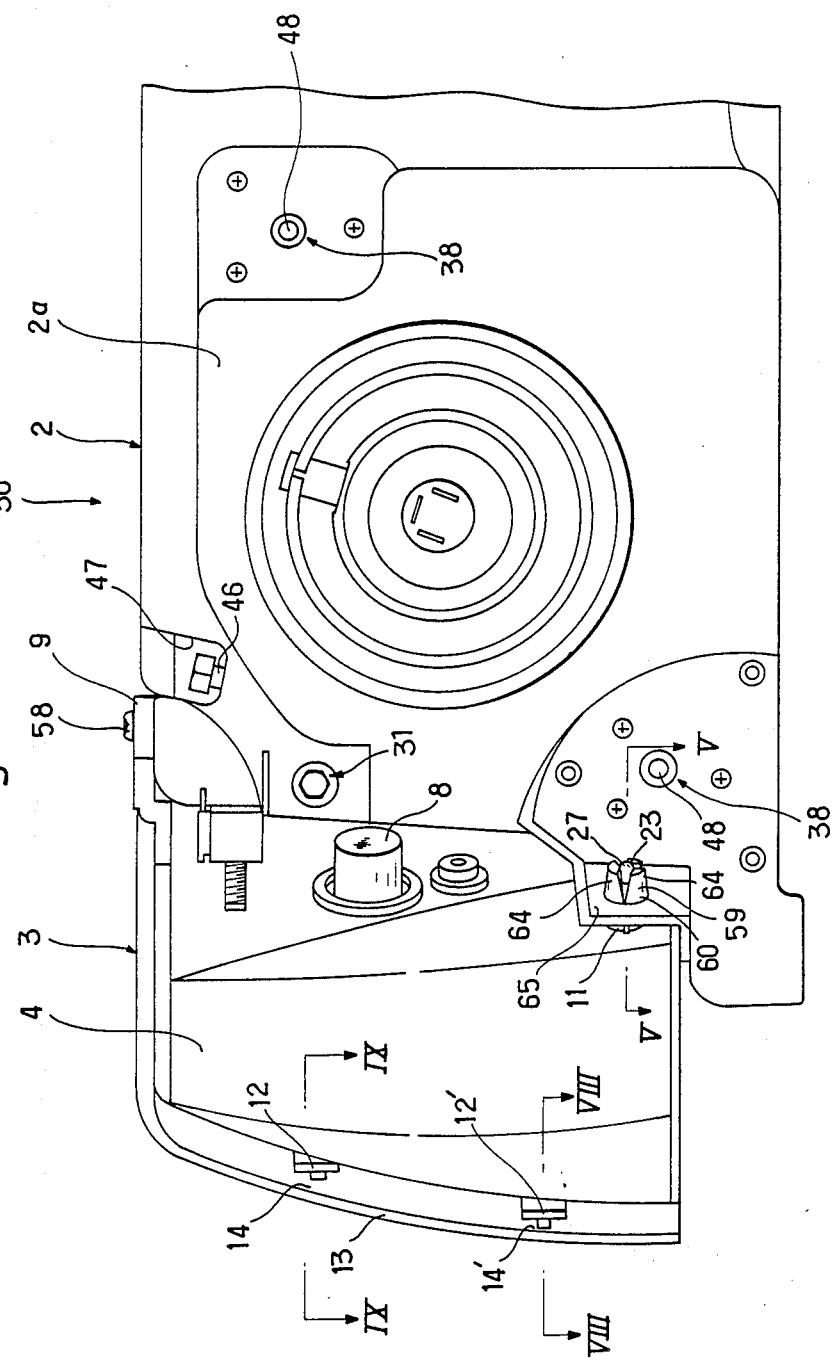
FIG. 3 is a rear view of the structure of FIG. 1.
Figure 8:
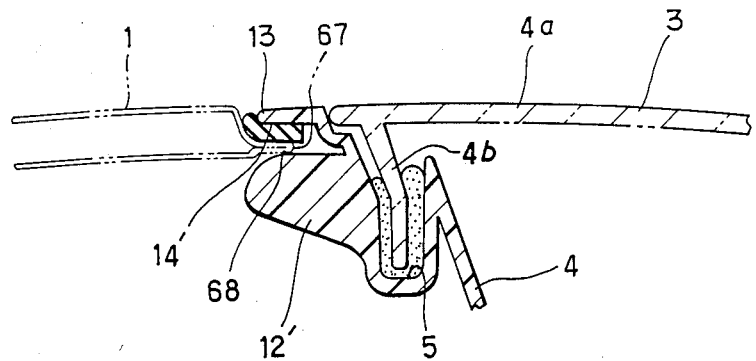
FIG. 8 is a section view taken along line VIII—VIII in FIG. 3.
Figure 9:
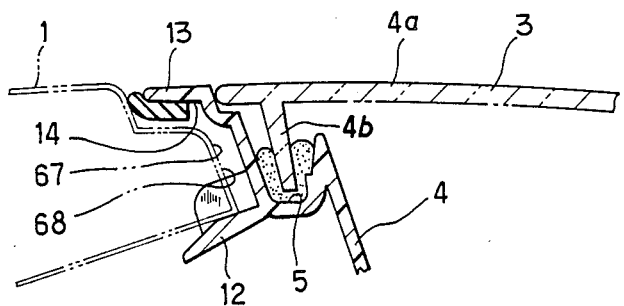
FIG. 9 is a section view taken along line IX—IX in FIG. 3.

The lamp body 4 has, as shown in FIGS. 3, 8 and 9, projecting portions 12 and 12' at locations spaced apart from each other in the vertical direction and at the rear end of the lamp body. The projecting portions 12 and 12' cooperate with a flange 13 of the lamp body 4 to form recessed portions 14 and 14' therebetween.

Figure 4:
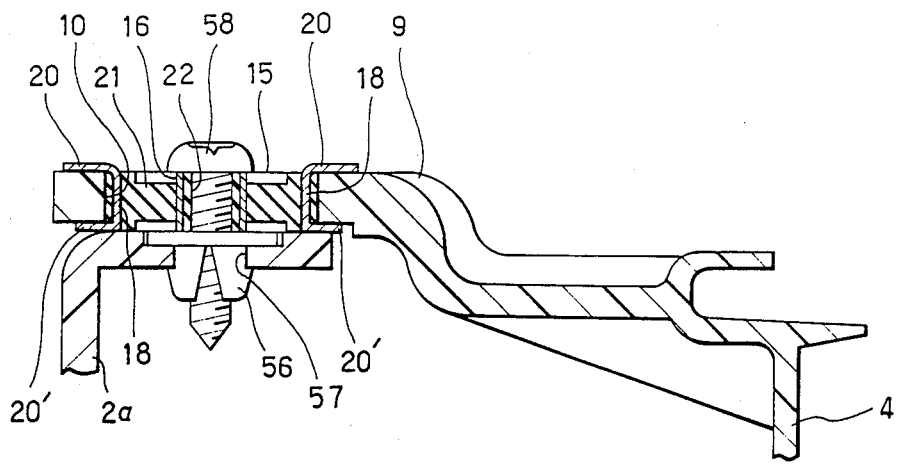
FIG. 4 is a section view taken along line IV—IV in FIG. 2.
Figure 6:
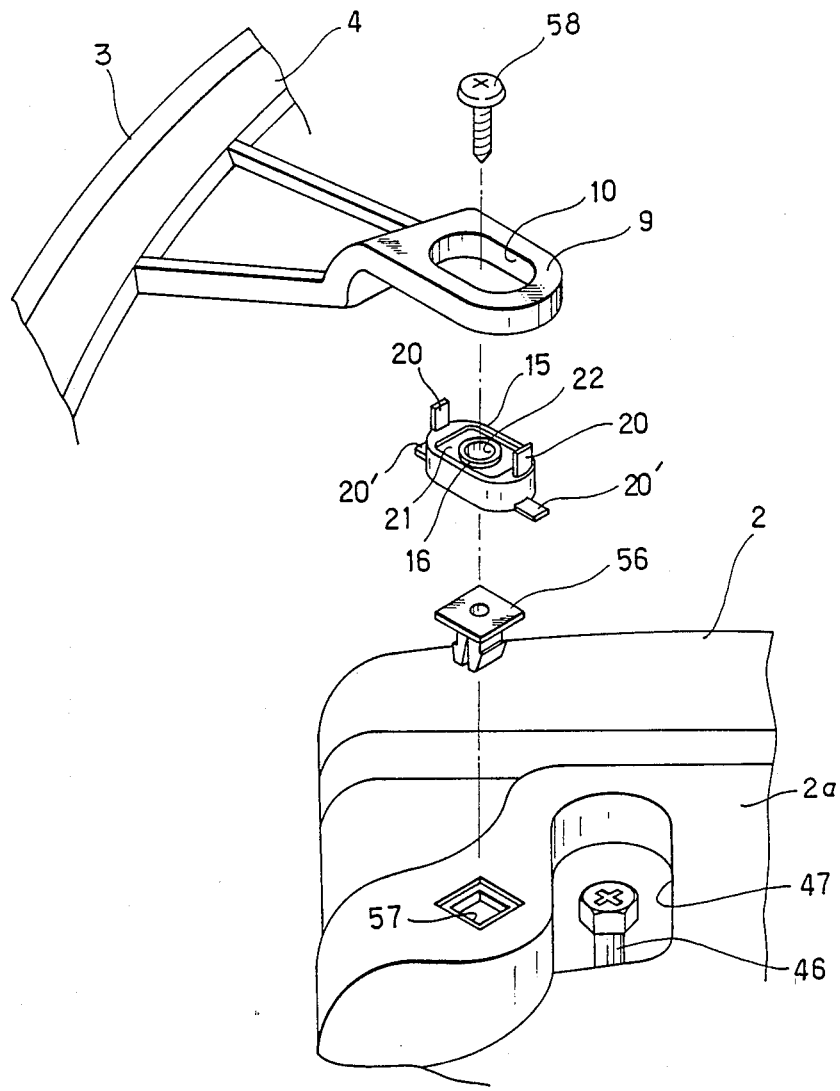
FIG. 6 is a perspective exploded view of an essential portion according to the invention.
Figure 13:
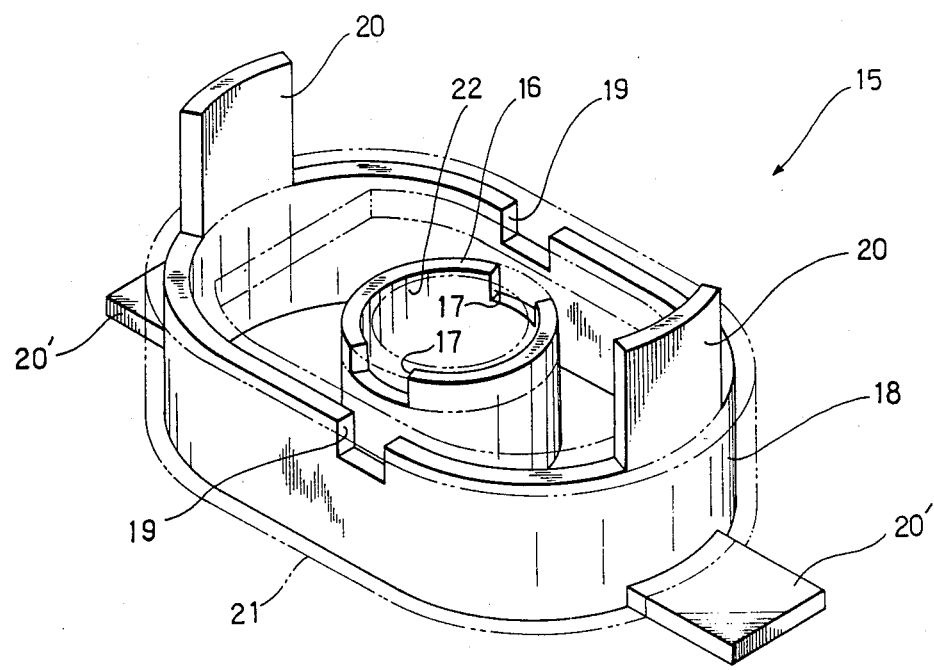
FIG. 13 is an enlarged perspective view of a portion supporting a resilient member.

As shown in FIGS. 4, 6 and 13, a spacer 15, formed of a metal and a resilient material such as rubber, is mounted in the opening 10 of the mounting stay 9. A cylindrical sleeve 16 having cutout portions 17 and 17 in opposite ends and an outer frame 18 having oval or elongated circular cross-section corresponding to the opening 10 are secured to the inner and outer circumference of a resilient member 21 respectively. Cutout portions 19 and 19 are formed in opposite ends of the outer frame 18. Further, mounting tabs 20, 20 and 20', 20' are formed on the outer frame 18. The cutout portions 17, 17 and 19, 19 are effective in reliably connecting the resilient member 21 with the sleeve 17 and the outer frame 18 respectively. The spacer 15 may be formed by a variety of processes, such as an insert forming process, outsert forming process and the like. The spacer 15 is mounted in the opening 16 in the mounting stay 9 by bending the tabs 20 and 20' as shown in FIG. 4.

The fitting pin 23 has, as shown in FIG. 5, a flange 24 in the intermediate portion, and a screw-thread portion 25 and a pin portion 26 on opposite sides of the flange 24. The screw-thread portion 25 is embedded in the boss 11 of the lamp body 4, and the pin portion 26 has a head portion 27 on the tip end. The head portion 26 has the largest diameter portion 28 at the location about two thirds from the tip end, and the diameter decreases gradually in opposite directions from the portion 28. A semi-spherical surface portion 29 is formed on the tip end of the head portion 27.

The headlight unit 2 and the housing 2a constitute a headlight device 30. The headlight unit 2 is tiltably supported on the housing 2a being secured to the vehicle body at three points A, B and C. In the front view of FIG. 1, the point A is located on the right upper position, the point B vertically downward of the point A and the point C being on the horizontally leftward of the point A.

Figure 11:
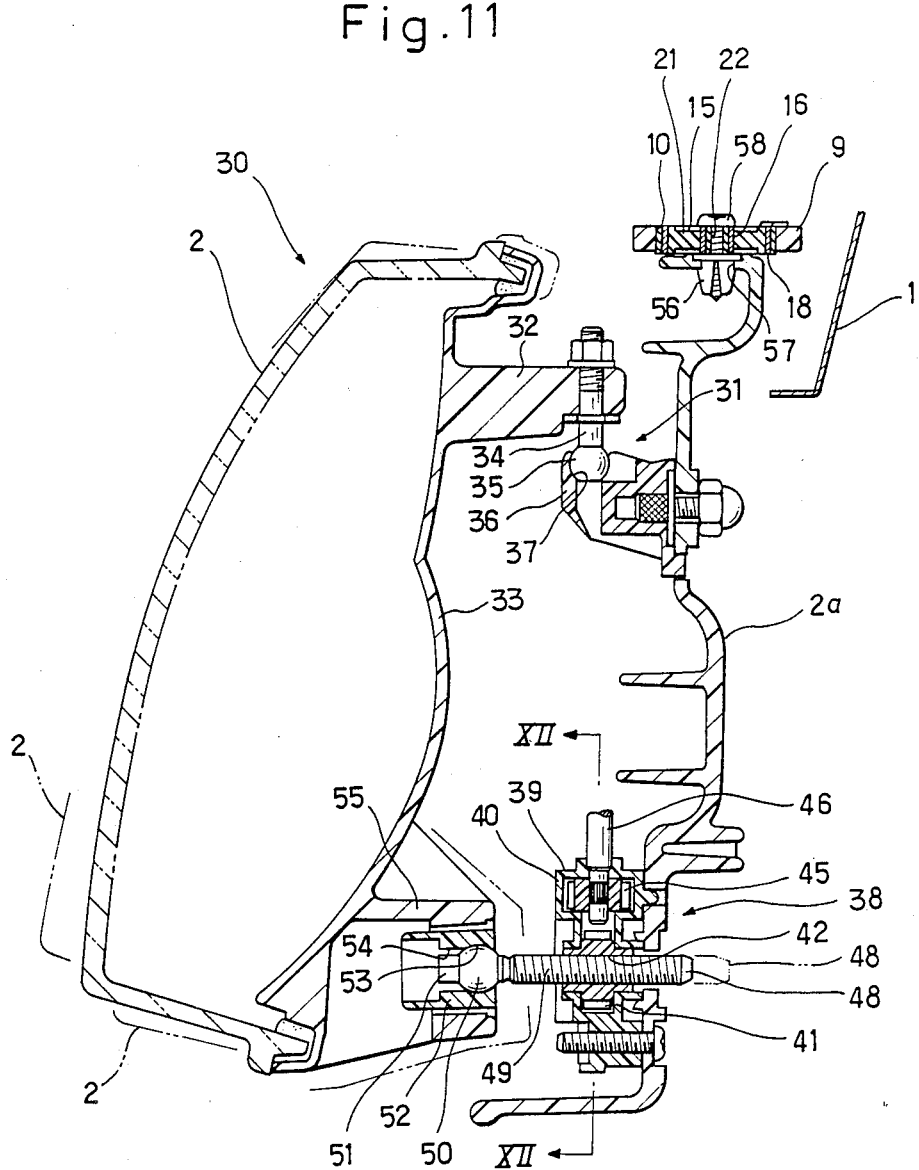
FIG. 11 is a section view taken along line XI—XI in FIG. 1.

A pivotably supporting mechanism 31 constitutes the supporting mechanism at the point A as shown in FIG. 11. The mechanism 31 includes a supporting portion 32 projecting from the rear surface of a lamp body 33 of the headlight unit 2, a pin 34 secured to the supporting portion 32 to extend vertically downward, a spherical portion 35 formed integrally on the lower end of the pin 34, and a receptacle 36 formed of synthetic resin material and having a recess 37 therein for receiving pivotally the spherical portion 35. The receptacle 36 is secured to the front surface of the housing 2a.

Figure 12:
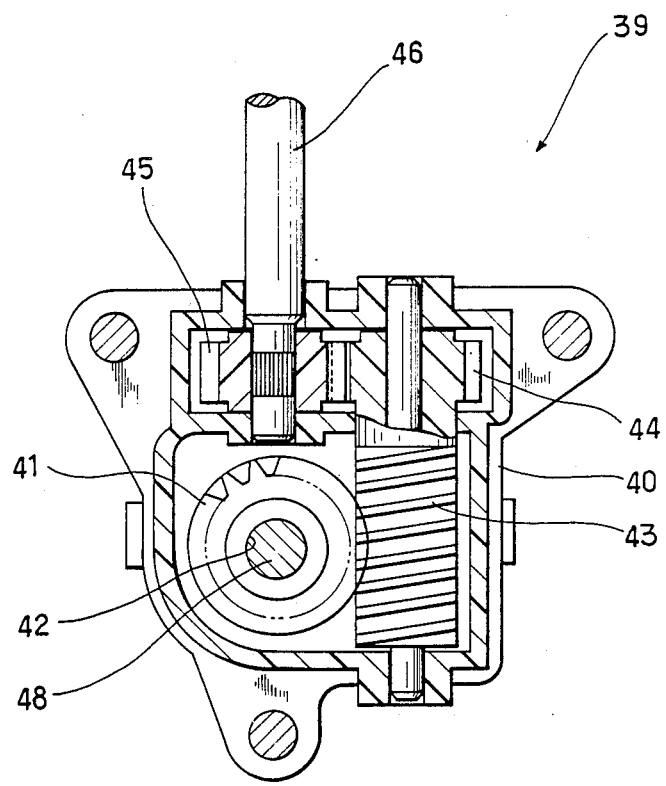
FIG. 12 is a cross-sectional view taken along line XII—XII in FIG. 11.

Supporting mechanisms at the points B and C are similar, thus, the description will be made with respect to the supporting mechanism 38 at the location of the point B which is shown in FIG. 11. The mechanism 38 comprises a gear unit 39 secured to the housing 2a and a casing 40 enclosing the gear unit 39 the details of which is shown in FIG. 12. A worm wheel 41 is rotatably supported in the casing 40 and has screw threaded bore 42 in the central portion thereof. A worm 43 is rotatably supported in the casing 40 and engages with the worm wheel 41. A pinion gear 44 is integrally formed on the upper end of the worm 43. A pinion gear 45 is rotatably mounted on the casing 40 to engage with the pinion gear 44. An actuating shaft 46 is secured to the pinion gear 45 and extends upward through the casing 40 with the upper end of which being located in an opening 47 formed in the upper surface portion of the housing 2a. When the actuating shaft 46 is rotated, the worm wheel 41 rotates correspondingly.

An adjusting shaft 48 comprises a screw threaded shaft portion 49, a ball portion 50 provided integrally on one end of the shaft portion 49, and an engaging piece 51 projecting from the tip end of the ball portion 50. The shaft portion 49 engages with the threaded bore 42 of the worm wheel 41.

A receptacle 52 formed of synthetic resin material is supported on a bracket 55 formed on the rear surface of the lamp body 33 of the headlight unit 2. The receptacle 52 has a generally cylindrical configuration and has in the inner surface a spherical recess 53 opening in the rear direction and an engaging recess 54 adjacent to the spherical recess 53. The spherical recess 53 rockingly receives the ball portion 50 of the adjusting shaft 48, and the engaging recess 54 engages with the engaging piece 51 of the adjusting shaft so as to prevent the rotation of the adjusting shaft 48. Thus, the front end of the adjusting shaft 48 is non-rotatably and tiltably supported on the lamp body 33 of the headlight unit 2.

When the worm wheel 41 is rotated due to the rotation of the actuating shaft 46, the adjusting shaft 48 engaging with the threaded bore 42 of the worm wheel 41 moves in the front and rear directions together with the lamp body 33 of the headlight unit 2 at the point B.

A similar adjusting mechanism 38 is also provided at the point C.

When the actuating shaft 46 at the point B is rotated, the headlight unit 2 tilts around the line connecting to points A and C, and when the actuating shaft 46 at the point C is rotated, and headlight unit 2 tilts around a line connecting the points A and B.

Description will be made again relative to connection between the headlight unit 2 and the clearance lamp 3.

As shown in FIGS. 4, 6, 7 and 11, a nut 56 of synthetic resin material is supported in a supporting opening 57 formed in the upper surface of the housing 2a and near to the clearance lamp 3. A mounting screw 58 is inserted through a bore 22 of the sleeve 16 of the spacer 15 and engages with the nut 56, thereby the mounting stay 9 secured to the clearance lamp 3 is connected to the housing 2a supporting the headlight 2 through resilient means.

Figure 7:
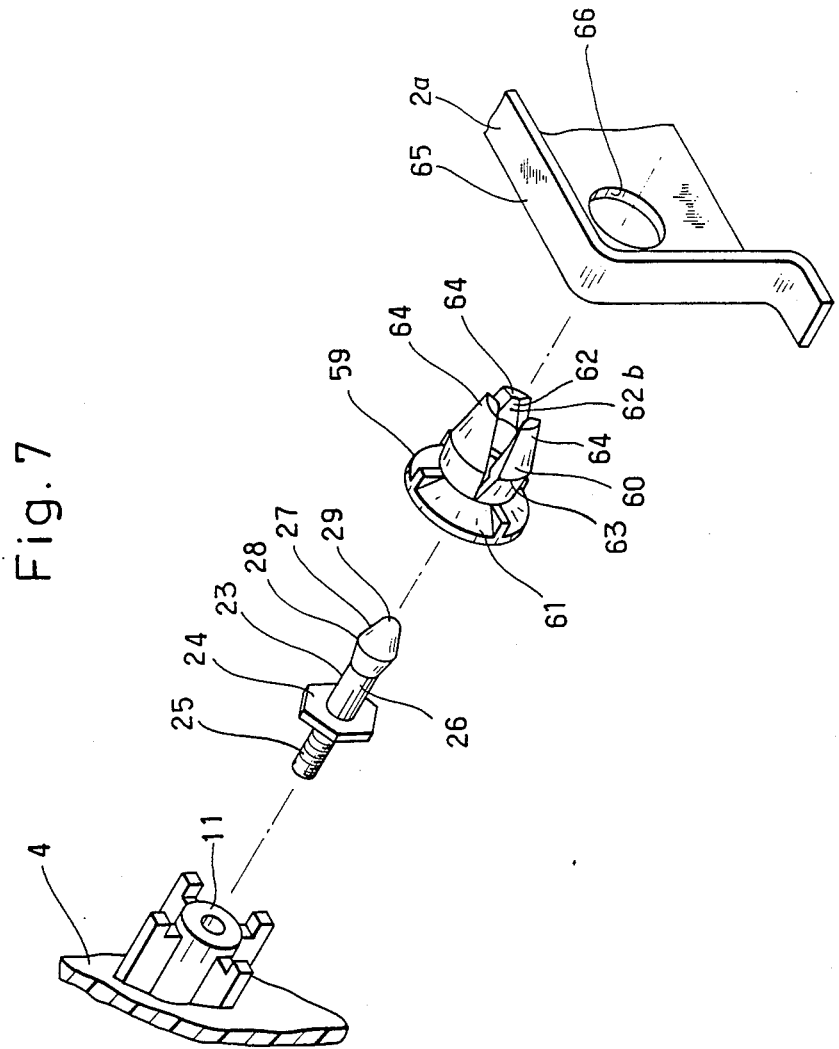
FIG. 7 is a perspective exploded view of another essential portion according to the invention.

A receptacle 59 formed of resilient synthetic resin material is mounted on a bracket 65 secured to the housing 2a. The receptacle 59 comprises a main portion 60, a flange 61 formed integrally on one end of the main portion 60, and an opening 62 extending through the main portion 60. As shown in FIGS. 5 and 7, the opening 62 consists of an introductory portion 62a and a retaining portion 62b, the configuration of the latter corresponding to the head portion 27 of the fitting pin 23. The main portion 60 has a large diameter portion 63 at the location spaced from the flange 61, and three spaced apart slits are formed in the main portion 60 to extend from the tip end to form three resilient portions 64 so that the portions 64 can resiliently deflect in the radial directions. The receptacle 59 is mounted in a circular supporting opening 66 formed in a bracket 65 of the housing 2a.

The head portion 27 of the fitting pin 23 secured to the lamp body 4 of the clearance lamp 3 is received in the retaining portion 62b of the receptacle 59 which in turn is mounted on the bracket 65, whereby the clearance lamp 3 is tiltably mounted on the bracket 59 of the housing 2a. It will be understood that the fitting pin 23 may be mounted on the housing 2a, with the receptacle 59 being mounted on the lamp body 4.

In FIGS. 8 and 9, there is shown an opening 67 formed in the vehicle body for receiving the clearance lamp 3. The outer and inner surfaces of a portion 68 (preferably an outer panel) of the vehicle body forming the opening 67 engages resiliently with opposing walls in the recessed portions 14 and 14' of the lamp body 4 of the clearance lamp 3. It will be understood that the stay 9 acts mainly in mounting the clearance lamp 3 on the body of the vehicle through the headlight, and the connection between the stay 9 and the housing 2a permits relative displacement in generally the horizontal directions under the control of resilient means.

The housing 2a is secured to the vehicle body 1 by fixing means not shown in the drawings. The headlight and the clearance lamp can easily be mounted on the vehicle body, since it is not required to connect the headlight and the clearance lamp independently with the vehicle body.

It will be noted that the wording vehicle body may include any member secured to the vehicle body.

According to the invention, the headlight 2 and the clearance lamp 3 are disposed contiguous to each other, and when the headlight 2 is tilted with respect to the housing 2a and the clearance lamp is pushed or pulled by the headlight 2, the clearance lamp can move accordingly due to the resilient deformation of the resilient portion 21 of the spacer 15 and to the axial and tilting movement of the fitting pin 23 with respect to the receptacle 59, thus, the movement of the headlight is not interfered with and the space between the clearance lamp and the headlight does not change excessively, and the clearance lamp and the headlight can maintain a unitary appearance.

FIG. 14 through FIG. 17 shows a second embodiment of the invention, wherein the construction of resilient means disposed in the opening in the stay 9 is modified. It will be understood that the construction is generally similar, and corresponding parts are depicted by same reference numerals with or without a prime applied thereto.

Figure 14:
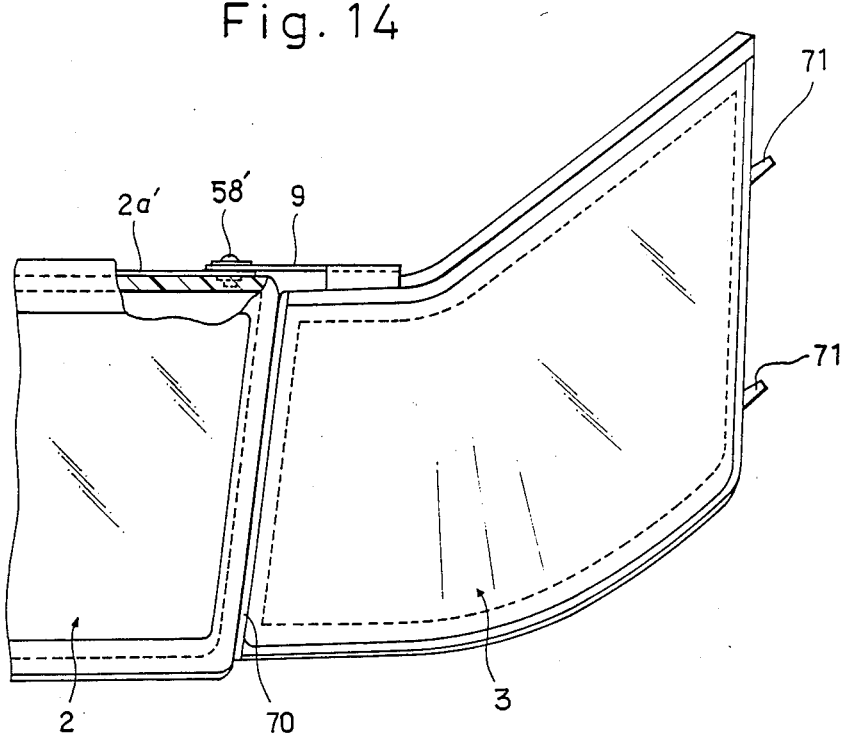
FIG. 14 is a partially broken front view of another embodiment according to the invention.
Figure 15:
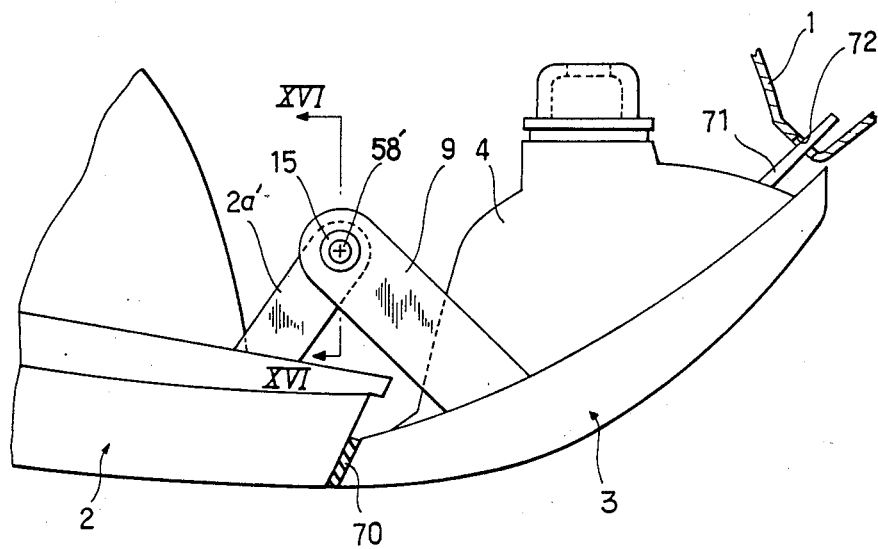
FIG. 15 is a plan view of the embodiment of FIG. 14.

The clearance lamp 3 is, as shown in FIGS. 14 and 15, formed to have two vertically spaced apart projections 71 which are inserted respectively into openings 72 which are formed in the vehicle body at the location remote from the headlight 2. A rubber rim 70 is arranged between the headlight 2 and the clearance lamp 3.

Figure 16:
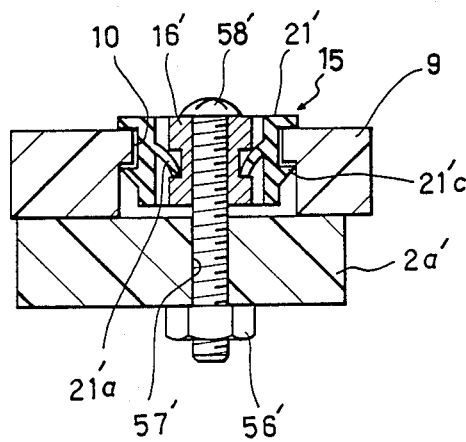
FIG. 16 is a cross-sectional view taken along line XVI—XVI in FIG. 15.
Figure 17:
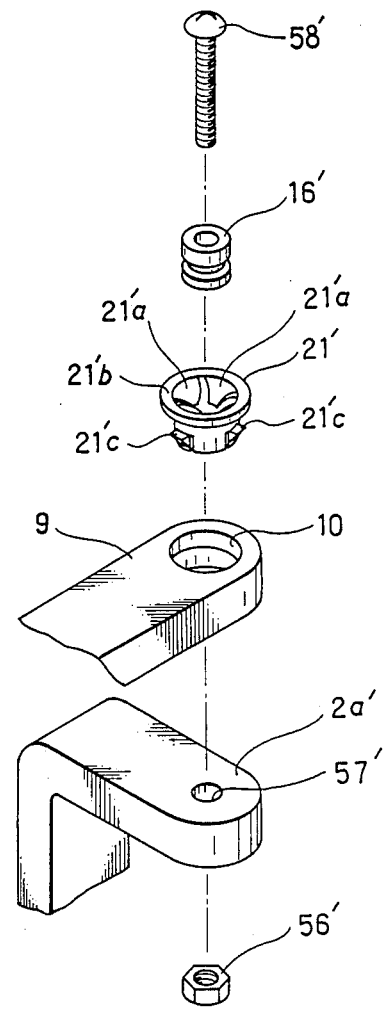
FIG. 17 is a perspective exploded view of an essential portion of the embodiment of FIG. 18.

The stay 9 similar to that of the first embodiment has a stepped circular opening 10 as shown in FIGS. 16 and 17 and a resilient member 21' and a sleeve 16' are disposed between the opening 10 in the stay 9 and the mounting screw 58'. The resilient member 21' has a plurality of resilient tabs 21'a projecting in the radially inward directions to engage with the sleeve 16' for permitting the radial displacement of the sleeve 16' with respect to the opening 10 but preventing the displacement of the sleeve 16' relative to the stay 9 in the upward direction as viewed in FIG. 16. The resilient member 21' acts similar to the outer frame 18 of FIG. 4, but has a plurality of resilient pawls or projections 21'c which are resiliently deformed when the member 21' is inserted into the opening 10. The pawls 21'c and a flange 21'b cooperate to retain the resilient member 21' on the stay 9. Shown at 56' in FIG. 16 is a nut, and at 57' is an opening formed in a stay 2'a integrally formed on the housing of the headlight unit.

Thus, the resilient member 21' permits the movement of the stay 9 relative to the housing 2a in the radial direction but the movement of the stay 9 in the axial direction or in the horizontal direction is prevented.

FIG. 18 through FIG. 22 show a third embodiment of the invention which also show another modified form of resilient means disposed in the opening of the stay 9, and of the location and construction of the fitting pin 23 (FIG. 5) for the clearance lamp. Parts corresponding to the first embodiment are depicted by the same reference numerals.

Figure 1:
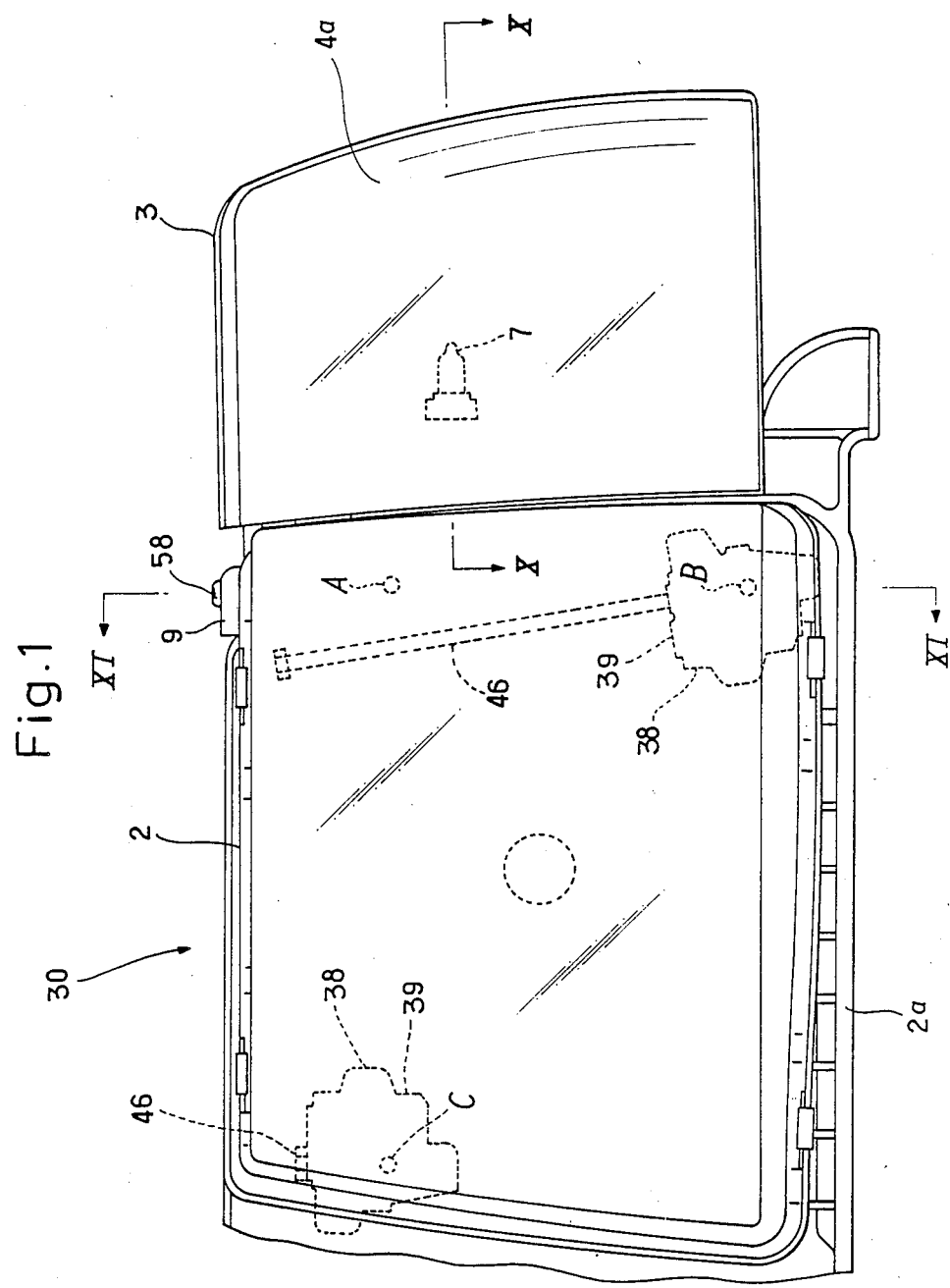
FIG. 1 is a front view of one example of a mounting structure of an automobile lamp according to the present invention.
Figure 2:
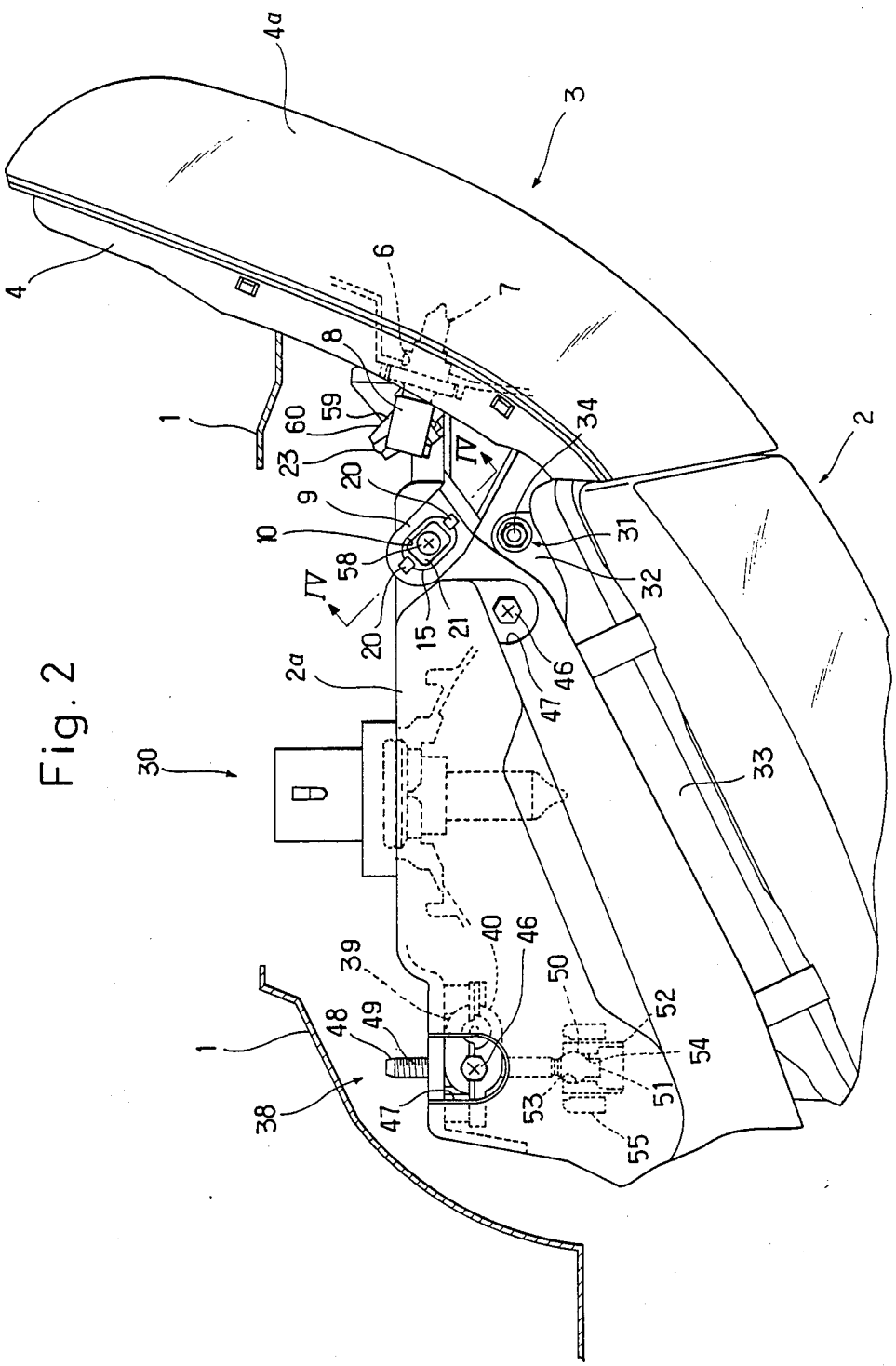
FIG. 2 is a plan view of the structure of FIG. 1.
Figure 18:
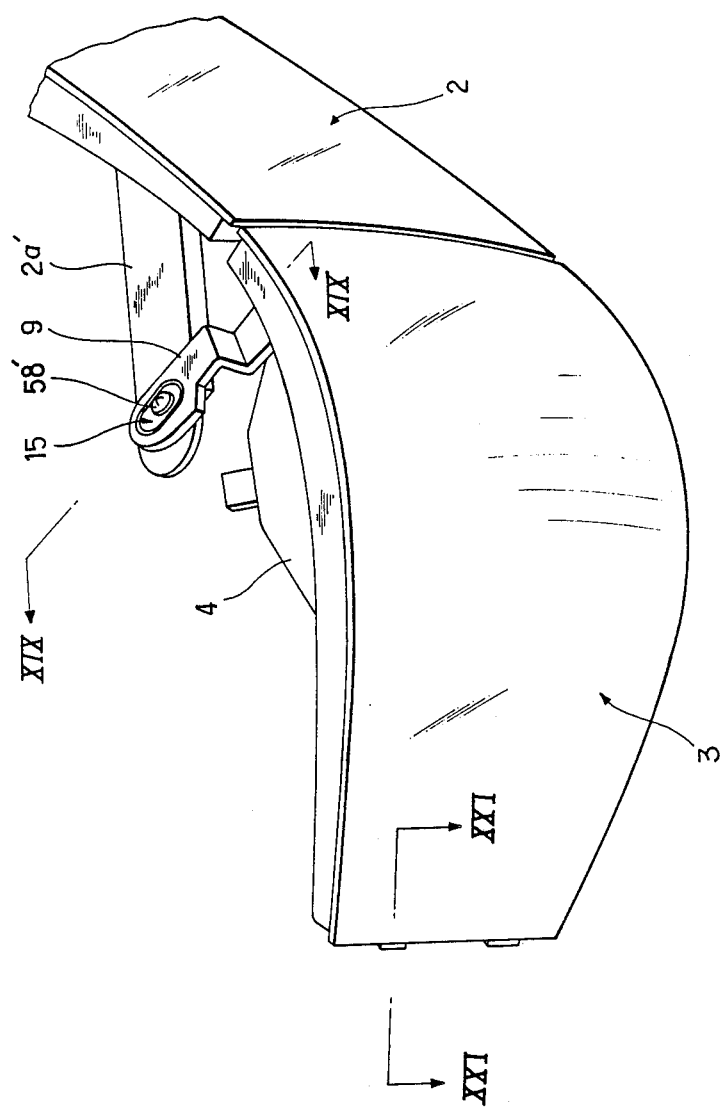
FIG. 18 is a perspective view of further embodiment of the invention.

FIG. 18 is generally similar to FIG. 2, but it will be noted that FIG. 2 shows the headlight 2 and the clearance lamp 3 of the left side of an automobile, while FIG. 18 shows those of the right side of the vehicle.

Figure 19:
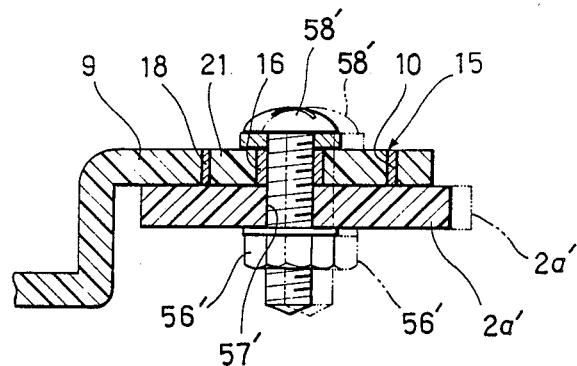
FIG. 19 is an enlarged sectional view taken along line XIX—XIX in FIG. 18.

In FIG. 18, a stay 2'a extends from the housing 2a (not shown) which is secured to the vehicle body, but the location of the mounting screw 58' is essentially the same between FIGS. 2 and 18. Further, the construction of the resilient member 21, the sleeve 16 and the outer frame 18 shown in FIG. 19 is essentially the same to that shown in FIG. 4. Shown at 56' in FIG. 19 is a nut, and at 57' is an opening formed in a stay 2'a integrally formed on the housing of the headlight unit.

Figure 22:
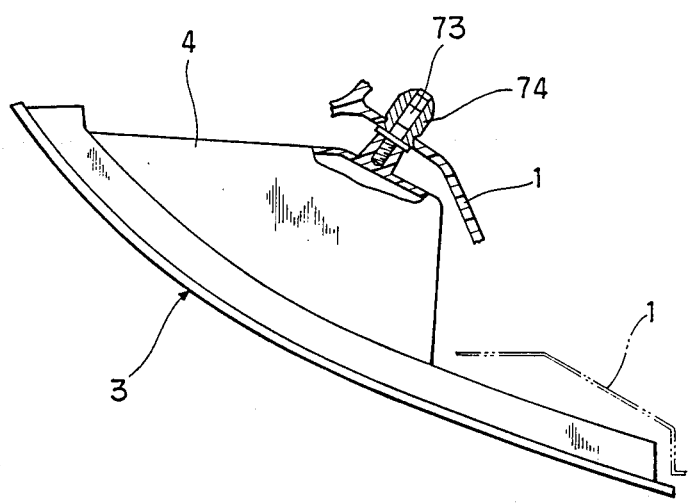
FIG. 22 is a partially broken bottom view of FIG. 18.

The clearance lamp 3 in the third embodiment is pivotally supported on the vehicle body as shown in FIG. 22. The location of a pivot pin 73 secured to the lamp body 4 of the clearance lamp 3 differs slightly from that of the fitting pin 23 shown in FIG. 5, but the function thereof is similar. The details of the pivot pin 73 and a fastener 74 are not shown in FIG. 22, but any suitable construction may be applied.

Figure 21:
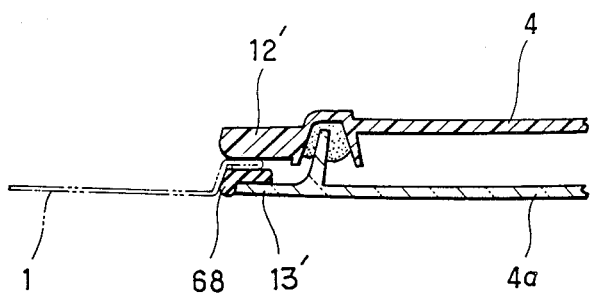
FIG. 21 is an enlarged sectional view taken along line XXI—XXI in FIG. 18.

The construction shown in FIG. 21 is also essentially the same to that of FIGS. 8 and 9. In FIG. 21, the edge 68 of the opening in the vehicle body is pivotally received in a recess. The recess is similar to the recess 14, 14' in FIGS. 8 and 9 but is defined by an extended portion 13' of the lens 4a of the clearance lamp and an extended portion 12' of the lamp body 4 of the clearance lamp.

Figure 20:
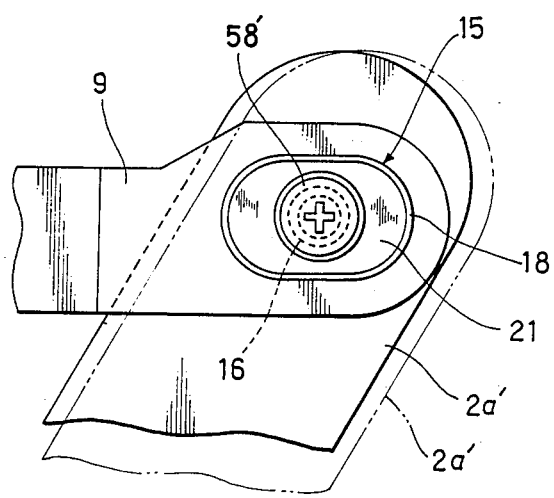
FIG. 20 is a plan view of FIG. 19.

Similar to the first embodiment, the clearance lamp 3 of the third embodiment is supported on the edge of the opening in the vehicle body at two locations which are remote from the headlight 2, thus, the clearance lamp is supported on the vehicle body at the above two locations, the pivotal supporting portion of FIG. 22 and the resilient supporting portion of FIGS. 19 and 20.

As described heretofore, according to the invention, a lamp disposed adjacent and contiguous a movable type headlight is reliably and easily be mounted on a vehicle body without interfering the adjusting movement of the headlight, and the appearance can be improved.

It will be understood that the invention is not limited to the embodiments, and various modifications or changes may easily be applied for those skilled in the art within the scope of the claims.

What is claimed is:

1. A mounting structure of an automobile lamp which is mounted contiguous to and at one side of a headlight of a unitary movable type tiltably supported on a housing which is secured to a body of a vehicle, said automobile lamp having a lamp body, said structure comprising:
   means for effecting tilting of said lamp body and said headlight as a unit in response to tilting movement of said headlight, said means comprising:
   at least one connecting member connecting said lamp body and said housing;
   resilient means engaging with a periphery of said connecting member, and
   wherein when the headlight is tiltably moved, the resilient means is deformed by the at least one connecting member so as to move said lamp body.

2. A mounting structure of an automobile lamp as set forth in claim 1, wherein said at least one connecting member comprises a plurality of connecting members provided between said housing and said lamp body.

3. A mounting structure of an automobile lamp as set forth in claim 2, wherein said plurality of connecting members comprise two connecting members provided between said housing and said lamp body and spaced from each other in the vertical direction.

4. A mounting structure of an automobile lamp as set forth in claim 1, wherein:
said at least one connecting member comprises a mounting stay provided on the lamp body of the automobile lamp;
said resilient means connects said mounting stay to the housing;
said mounting stay has an opening therein, and said resilient means is mounted in the opening so as to act as a spacer between the lamp body and the housing; and
further comprising a mounting screw inserted through the resilient means and secured to said housing.

5. A mounting structure of an automobile lamp as set forth in claim 1, wherein said at least one connecting member comprises a fitting pin and said resilient means comprises a receptacle, said receptacle receiving said fitting pin resiliently in the radial direction of the fitting pin and being displaceable in the axial direction of the fitting pin.

6. A mounting structure as set forth in claim 5, wherein said fitting pin is secured to the lamp body and has a head portion, said receptacle is formed of a resilient material and is mounted in an opening of the housing, and the head portion of the fitting pin is received in the receptacle.

7. A mounting structure as set forth in claim 6, wherein said fitting pin has a head portion on a tip end which has the largest diameter at an intermediate location within the diameter decreasing in opposite directions, and the receptacle is formed of a resilient synthetic resin material and a correspondingly shaped receiving bore is formed therein with a wall of which being formed to have axial slots.

8. A mounting structure of an automobile lamp which is mounted contiguous to and at one side of a headlight of a unitary movable type tiltably supported on a housing which is secured to a body of a vehicle, comprising:
means for effecting tilting of said lamp body and said headlight as a unit in response to tilting movement of said headlight, said means comprising:
a mounting stay provided on a lamp body of the automobile lamp;
resilient means for connecting said mounting stay to said housing, said mounting stay having an opening therein, said resilient means being mounted in the opening and acting as a spacer between the lamp body and the housing; and
wherein tilting movement of said headlight causes tilting movement of said lamp through the mounting stay and resilient means.

9. A mounting structure as set forth in claim 8, further comprising a mounting screw secured to said housing and inserted through the resilient means.

10. A mounting structure as set forth in claim 8, wherein said spacer includes inner and outer cylindrical members, and said resilient means is disposed between said inner and outer cylindrical members, and a mounting screw is inserted through the inner cylindrical member and is secured to said housing.

11. A mounting structure as set forth in claim 10, wherein said inner and outer cylindrical members are integrally connected through the resilient member such as rubber, metal or synthetic resin material.

12. A mounting structure of an automobile lamp which is mounted contiguous to and at one side of a headlight of a unitary movable type tiltably supported on a housing which is secured to a body of a vehicle, comprising:
means for effecting tilting of said lamp body and said headlight at a unit in response to tilting movement of said headlight, said means comprising:
a mounting stay assembly comprising:
a mounting stay provided on a lamp body of the automobile lamp; and
resilient means for connecting said mounting stay to the housing; and
a fitting pin assembly comprising:
a fitting pin and a receptacle for connecting said lamp body to said housing, and wherein said receptacle resiliently supports the fitting pin while permitting axial displacement of the fitting pin; and
wherein said headlight and said automobile lamp are connected together through said mounting stay assembly and said fitting pin assembly such that tilting movement of said headlight causes tilting movement of said automobile lamp.

13. A mounting structure as set forth in claim 12, wherein the fitting pin is provided to project from a portion of the lamp body, which portion is spaced apart from the mounting stay, and said receptacle is provided on the housing for resiliently supporting the fitting pin and permitting pivotal movement of the fitting pin.

14. A mounting structure as set forth in claim 13, wherein the lamp body is formed to have at least one recessed portion at an end remote from the headlight for engaging with correspondingly shaped projections formed on a member associated with the vehicle body.

15. A mounting structure as set forth in claim 14, wherein the projections are defined by an edge portion of an opening formed in an outer panel of the vehicle body for locating and receiving said lamp and said headlight.

16. A mounting structure as set forth in claim 13, wherein said fitting pin has a head portion on a tip end which has the largest diameter at an intermediate location with the diameter decreasing in opposite directions, and the receptacle is formed of a resilient synthetic resin material and a correspondingly shaped receiving bore is formed therein with a wall of which being formed to have axial slots.

17. A mounting structure as set forth in claim 13, further comprising:
a spacer including inner and outer cylindrical members received in an opening formed in the mounting stay, wherein said resilient means is disposed between said inner and outer cylindrical members; and
a mounting screw inserted through the inner cylindrical member and secured to said housing.

18. A mounting structure as set forth in claim 18, wherein said inner and outer cylindrical members are integrally connected through the resilient member such as rubber, metal or synthetic resin material.

19. A mounting structure as set forth in claim 13, wherein said resilient means comprises a plurality of radially and resiliently extending members projecting to engage with a sleeve.

20. A mounting structure as set forth in claim 19, wherein said radially and resiliently extending members are circumferentially spaced tabs which are integrally formed on the resilient means.

21. A mounting structure as set forth in claim 14, further comprising a supporting stay formed on the housing of the headlight to cooperate with the mounting stay of the lamp body.

* * * * *